No. 733,915. PATENTED JULY 14, 1903.
G. B. McC. PIKE.
NUT LOCK.
APPLICATION FILED APR. 14, 1903.
NO MODEL.
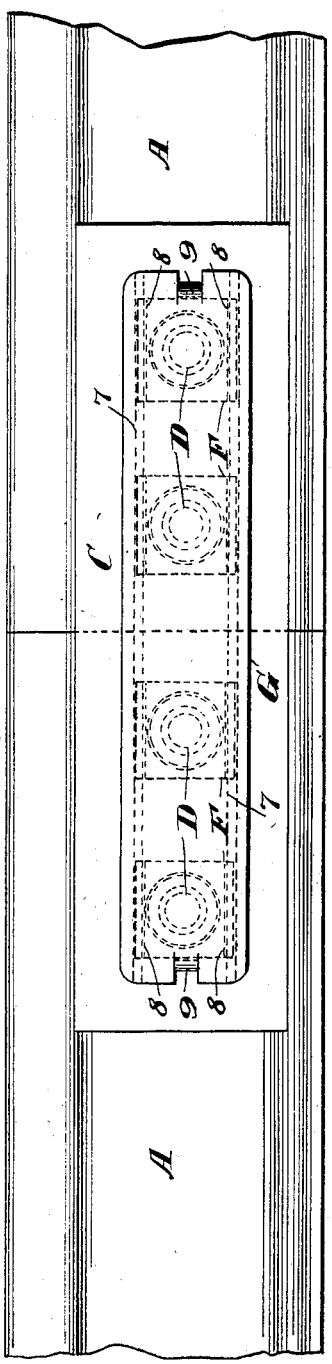
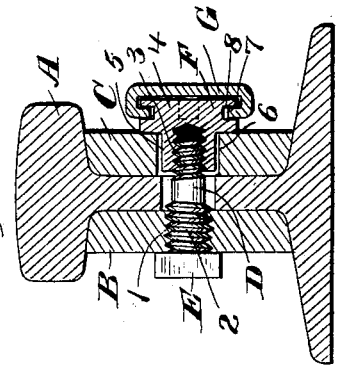
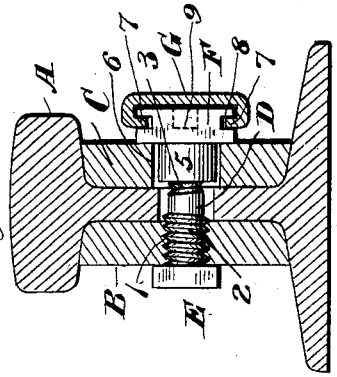
Witnesses:
Geo H Botts
W H Kennedy
Inventor:
George B. McClellan Pike No. 733,915. Patented July 14, 1903.

UNITED STATES PATENT OFFICE.

GEORGE B. McCLELLAN PIKE, OF NEW YORK, N. Y.

NUT-LOCK.

SPECIFICATION forming part of Letters Patent No. 733,915, dated July 14, 1903.

Application filed April 14, 1903. Serial No. 152,525. (No model.)

*To all whom it may concern:*

Be it known that I, GEORGE B. MCCLELLAN PIKE, a citizen of the United States, residing at New York, county of New York, and State of New York, have invented new and useful Improvements in Nut-Locks, fully described and represented in the following specification and the accompanying drawings, forming a part of the same.

This invention relates to improvements in nut-locks for securing the ends of rails together, the invention consisting in a novel construction of a bolt and nut whereby the fish-plates connecting the ends of the rails are secured to the said rails.

The invention also consists in an auxiliary locking plate or shoe for preventing the nut from turning on the bolt, and thereby allowing the fish-plates connecting the rails to become loose and the consequent separation or spreading of the rails.

In the drawings accompanying this specification, Figure 1 is a side view of the abutting ends of two rails connected by the usual fish-plates and showing the locking-plate in position. Figs. 2 and 3 are sectional views of the same.

In the drawings, A represents the rails, and B C the fish-plates connecting the rails. The plate B has a screw-threaded hole 1, in which is screwed the outer threaded end 2 of a bolt D, having the usual squared head E. The web of the rail A is perforated to allow the bolt D to be passed through. The bolt D is reduced in diameter at its inner end and is screw-threaded, as shown at 3, in a direction reversely to the threaded end 2, and the threaded end 3 of the bolt is engaged by a nut F, having a squared head 4 and an internally-screw-threaded extension 5 for engaging the thread 3 of the bolt D, the plate C being provided with a perforation 6, through which the extension 5 of the nut F is passed.

The heads 4 of the nuts F are grooved, as shown at 8, and these grooves are entered by the bent-over flanges 7 of a locking plate or shoe G, the plate and nuts F being preferably positioned on the inner side of the rail. The locking-plate G is placed over the squared heads 4 of the nuts F, as shown in Figs. 2 and 3, the flanges 7 being entered in each of the grooves 8 of the heads 4. It will be seen that when the nuts F have been screwed onto the bolt D and the locking-plate G is placed in position, as just described, the heads 4 of the nuts F will be prevented from turning, their upper and lower edges coming into contact with the inner surfaces of the flanges 7. The locking-plate G is bent down over the heads of the end nuts, as shown at 9, thus preventing the locking-plate from working loose and moving in an endwise direction off the nuts F, and the flanges 7 and grooves 8 also prevent lateral movement of the locking-plate. It will be seen that with the plate G in position the nuts F cannot turn on the bolt D, and the bolt D is prevented from turning in the fish-plate B by the reverse thread 3, working in the nut F.

While I have shown a common form of rail connection, it will be understood that the invention is not limited to this form, but may be readily adapted to various forms of rail connections without departing from my invention.

What I claim is—

1. A nut-lock consisting of a bolt having a right and left hand screw-thread for engaging respectively screw-threads in a connecting-plate and a nut, and a locking-plate for engaging said nut, substantially as described.

2. In a nut-lock, the combination of the rails, fish-plates connecting said rails, a threaded bolt having at one end a right-hand thread and at its other end a left-hand thread, or vice versa, a nut threaded internally in a direction to engage one of said threads, and a locking-plate for engaging said nut, substantially as described.

3. In a nut-lock, the combination of the rails, the connecting-plates, one of which is provided with a threaded opening, a bolt having a thread for engaging said threaded opening, a nut having an internal thread for engaging a second thread on said bolt, a groove formed in the head of said nuts and a locking-plate having flanges for engaging said grooves, substantially as described.

4. The combination of the rails A, the connecting-plates B, C, the headed bolt D, having the right and left hand threads 2, 3, a nut F having an internal left-hand thread for engaging the bolt D, the grooves 8 formed in said nuts F and the locking-plate G provided with the flanges 7 for engaging said grooves 8 in the heads 4 of the nut F, and a turned-down locking portion as 9, substantially as described.

In testimony whereof I have hereunto set my hand in the presence of two subscribing witnesses.

GEORGE B. McCLELLAN PIKE.

Witnesses:
GEORGE H. BOTTS,
W. H. KENNEDY.